United States Patent
Courtois De Lourmel et al.

(10) Patent No.: US 12,366,257 B2
(45) Date of Patent: Jul. 22, 2025

(54) ACTUATOR WITH OFFSET SUPPLY PORT

(71) Applicant: SAFRAN LANDING SYSTEMS, Vélizy-Villacoublay (FR)

(72) Inventors: Yves Courtois De Lourmel, Moissy-Cramayel (FR); Sébastien Messe, Moissy-Cramayel (FR); Jean-Baptiste Kamis, Moissy-Cramayel (FR); Arnaud Le Breton, Moissy-Cramayel (FR); Nicolas Nguyen, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 0 days.

(21) Appl. No.: 17/794,209

(22) PCT Filed: Jan. 20, 2021

(86) PCT No.: PCT/EP2021/051228
§ 371 (c)(1),
(2) Date: Jul. 20, 2022

(87) PCT Pub. No.: WO2021/148486
PCT Pub. Date: Jul. 29, 2021

(65) Prior Publication Data
US 2023/0045934 A1   Feb. 16, 2023

(30) Foreign Application Priority Data
Jan. 24, 2020  (FR) ...................................... 2000724

(51) Int. Cl.
*F15B 15/14*   (2006.01)
*B64C 25/22*   (2006.01)

(52) U.S. Cl.
CPC ............ *F15B 15/149* (2013.01); *B64C 25/22* (2013.01); *F15B 15/1428* (2013.01)

(58) Field of Classification Search
CPC ..... F15B 15/149; F15B 15/1428; B64C 25/22
See application file for complete search history.

(56) References Cited

U.S. PATENT DOCUMENTS 1,918,426 A * 7/1933 Radnor .................. B64C 25/22
244/101
2,336,794 A * 12/1943 Levy ...................... B64C 25/22
244/102 R
(Continued)

FOREIGN PATENT DOCUMENTS

DE   10 2009 021 351 A1   12/2009
DE   10 2016 217 006 A1   3/2018
(Continued)

OTHER PUBLICATIONS

English translation of Written Opinion mailed Mar. 24, 2021, issued in corresponding International Application No. PCT/EP2021/051228, filed Jan. 20, 2021, 8 pages.
(Continued)

*Primary Examiner* — Dustin T Nguyen
(74) *Attorney, Agent, or Firm* — CHRISTENSEN O'CONNOR JOHNSON KINDNESS PLLC

(57) ABSTRACT

An actuator includes a body and at least a first offset connection port that is connected to the body by a first duct projecting from the body. The first connection port is mechanically connected to the body at least by first and second struts. The first strut and the second strut extend from the first connection port, respectively, to a first segment of the body and to a second segment of the body that is axially spaced apart from the first segment. An undercarriage includes such an actuator as its locking or unlocking actuator.

13 Claims, 5 Drawing Sheets

(56) References Cited

U.S. PATENT DOCUMENTS

| | | | | | |
|---|---|---|---|---|---|
| 2,401,378 | A | * | 6/1946 | Smith | B64C 25/22 |
| | | | | | 92/164 |
| 2,475,723 | A | * | 7/1949 | Sanford | B64C 25/22 |
| | | | | | 267/64.28 |
| 4,948,041 | A | * | 8/1990 | McCauley | A01G 25/00 |
| | | | | | 236/99 J |
| 8,028,954 | B2 | * | 10/2011 | Leutard | F15B 20/004 |
| | | | | | 244/102 R |
| 8,070,095 | B2 | * | 12/2011 | Luce | B64C 25/22 |
| | | | | | 244/102 SS |
| 2020/0191174 | A1 | * | 6/2020 | Tam | F15B 11/123 |

FOREIGN PATENT DOCUMENTS

| | | | | |
|---|---|---|---|---|
| DE | 102016217006 | * | 3/2018 | F15B 15/28 |
| FR | 2 755 742 A1 | | 5/1998 | |

OTHER PUBLICATIONS

International Preliminary Report on Patentability mailed Jul. 26, 2022, issued in corresponding International Application No. PCT/EP2021/051228, filed Jan. 20, 2021, 7 pages.

International Search Report mailed Mar. 24, 2021, issued in corresponding International Application No. PCT/EP2021/051228, filed Jan. 20, 2021, 5 pages.

Written Opinion mailed Mar. 24, 2021, issued in corresponding International Application No. PCT/EP2021/051228, filed Jan. 20, 2021, 6 pages.

* cited by examiner

ACTUATOR WITH OFFSET SUPPLY PORT

FIELD OF THE DISCLOSURE

The present disclosure relates to an actuator having at least one feed port that is offset. By way of example, the actuator may be a hydraulic actuator for fitting to an aircraft.

BACKGROUND

Aircraft are known in which landing gear is mounted to be movable between a deployed position and a retracted position, and includes an unlocking actuator allowing the landing gear to be moved from the retracted position to the deployed position. In general, the unlocking actuator is a hydraulic actuator comprising a tubular body in which a rod is slidably mounted. The rod is secured to a piston that subdivides the inside volume of the body into two chambers that are isolated from each other. Two connection ports enable a fluid to be inserted into or removed from one or the other of the chambers, thereby moving the rod.

For reasons of actuator size and dynamic performance, the connection ports are offset so as to be spaced apart from the actuator body. Each connection port is connected to the actuator body by a duct that opens out into a respective one of the chambers. The ducts are conventionally channels that have been drilled in a block projecting from an outside surface of the actuator body. The body and the block are generally manufactured either by forging or else by assembling together parts that have previously been machined.

Such an arrangement makes the actuator relatively heavy and voluminous, thereby penalizing the overall weight of the apparatus and making it complicated to incorporate the actuator in the volume made available in the aircraft for the landing gear.

An object of the disclosure is thus to propose an actuator with offset feed ports that enables the above-mentioned problems to be obviated at least in part.

SUMMARY

To this end, the disclosure provides an actuator comprising a body and at least a first offset connection port. The connection port is connected to the body by a first duct projecting from the body.

According to the disclosure, the first connection port is mechanically connected to the body at least by first and second struts, the first strut and the second strut extending from the first connection port respectively to a first segment of the body and to a second segment of the body that is axially spaced apart from the first segment.

Using such struts to connect the connection port to the body enables the weight of the actuator to be limited, since the struts leave empty spaces between them with no material, while still guaranteeing that the connection port has good vibration and pressure performance.

In a particular embodiment of the disclosure, the actuator includes a second offset connection port connected to the body by a second duct. The second connection port is mechanically connected to the body at least by third and fourth struts, the third and fourth struts extending from the second connection port to two portions of the body that are axially spaced apart from each other.

In particular manner, the second connection port is in alignment with the first connection port, and the fourth strut and the second strut have a segment in common.

In particular manner, at least one of the third and fourth struts is arranged to connect a portion of the first duct mechanically to the body.

In particular manner, at least two of the struts include respective portions lying in a longitudinal mid-plane of the body.

In particular manner, the first duct lies in the longitudinal mid-plane of the body.

In particular manner, the first and second struts are substantially identical in length.

In particular manner, at least one of the struts has a cross-section that is V-shaped.

According to a particular characteristic, the actuator includes a web providing a mechanical connection between the body, each duct, and the struts.

In particular manner, the web includes drain holes. According to a particular characteristic, the actuator includes at least one rib extending on one side of the web from one of the ducts to one of the struts. In particular manner, the body, each duct, and each connection port together form a single piece that is obtained by additive manufacturing.

The disclosure also provides an undercarriage having at least an extended position and a retracted position, and including such an actuator for locking or unlocking the undercarriage in at least one of its two positions.

DESCRIPTION OF THE DRAWINGS

The disclosure can be better understood in the light of the following description, which is purely illustrative and non-limiting, and which should be read with reference to the accompanying drawings, in which.

DETAILED DESCRIPTION

Figure 1:
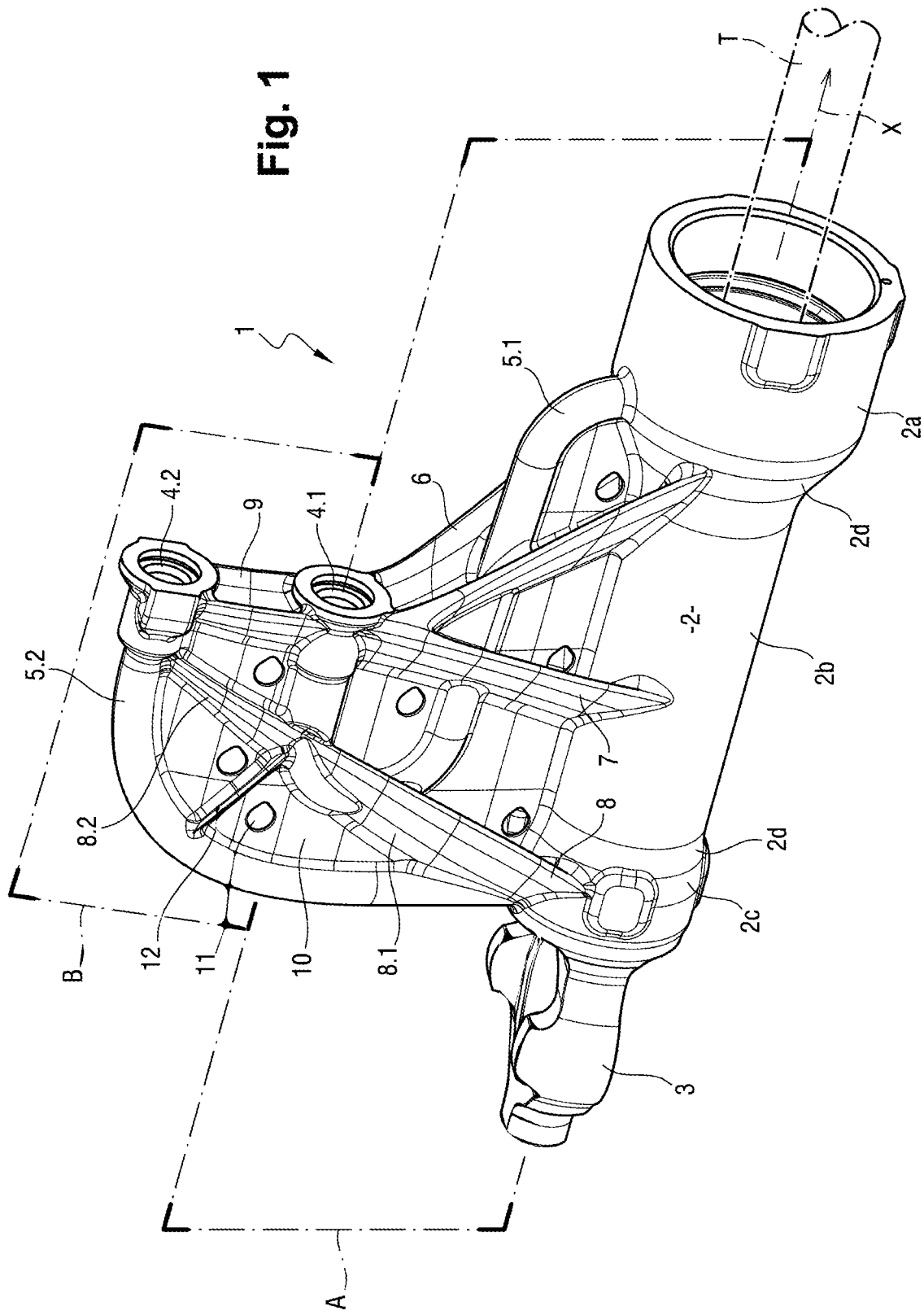
FIG. 1 is a perspective view of an actuator in a particular embodiment of the disclosure.
Figure 2:
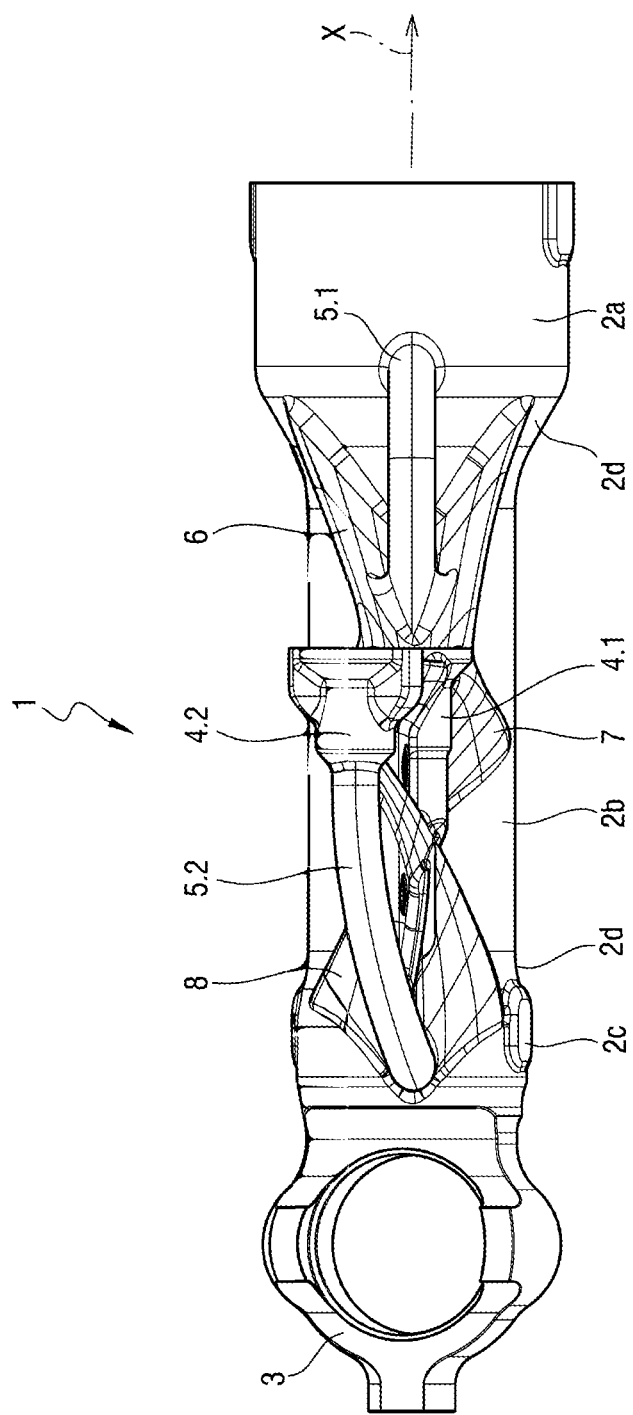
FIG. 2 is a view from above of the actuator shown in FIG. 1.
Figure 3:
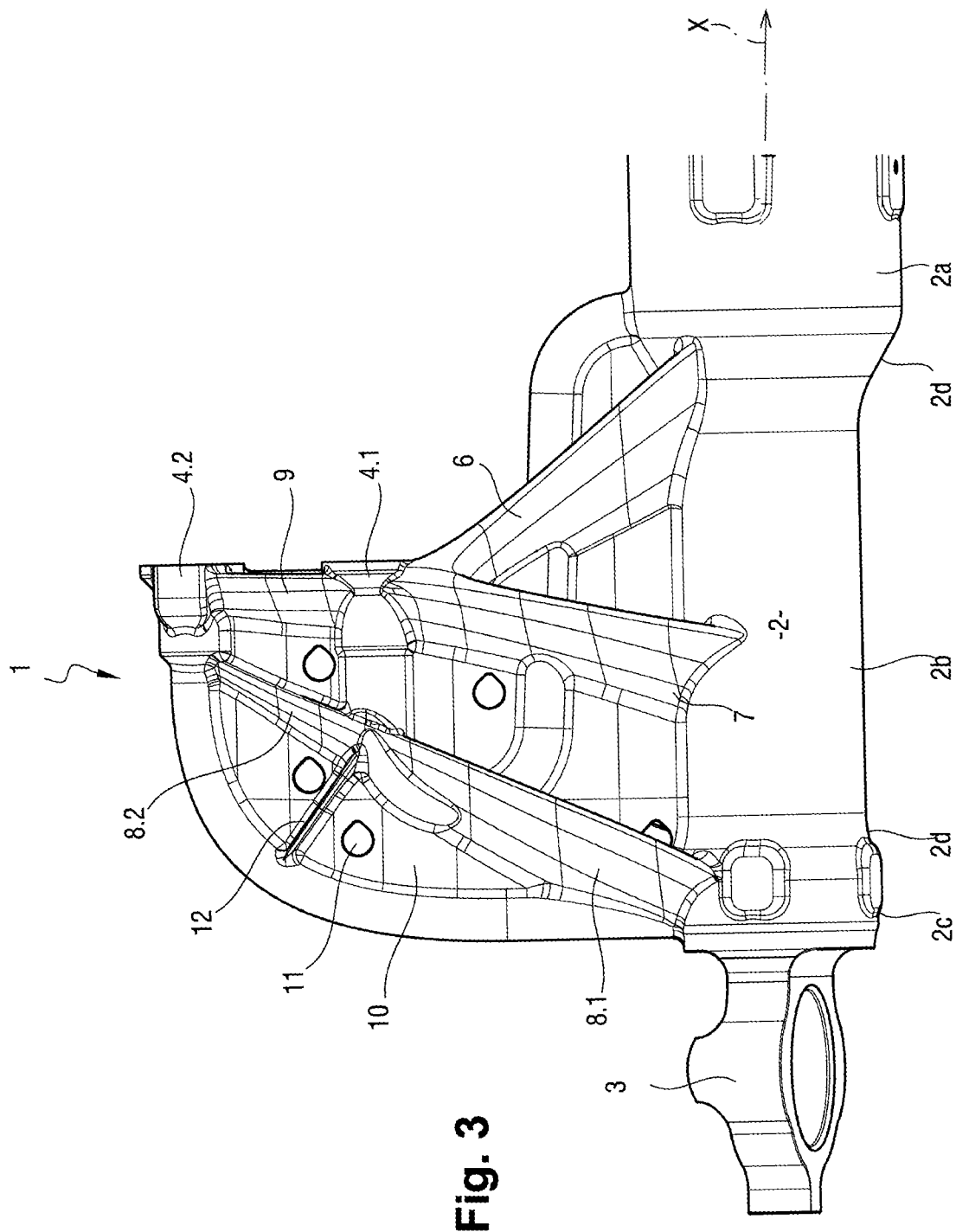
FIG. 3 is a side view of the actuator shown in FIG. 1.
Figure 4:
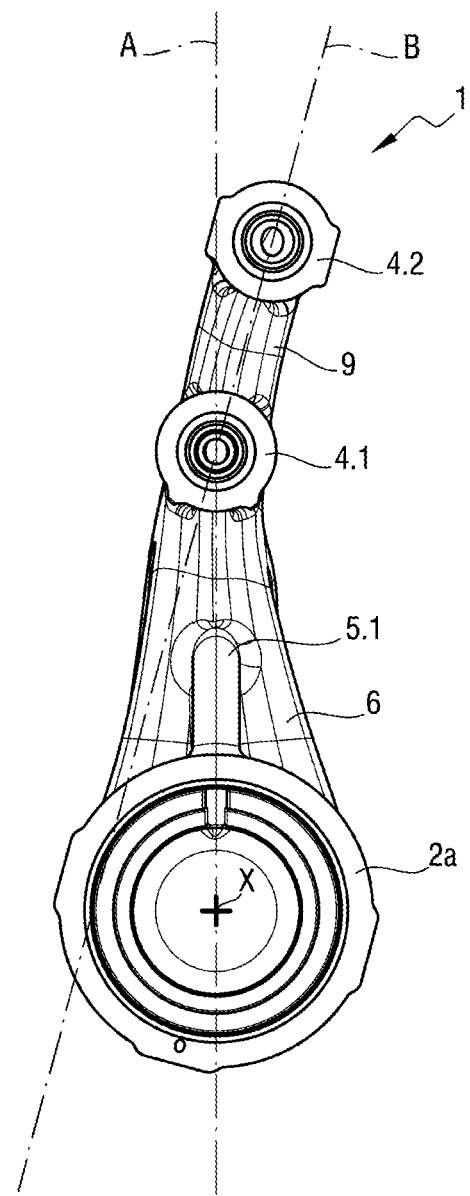
FIG. 4 is an end view of the actuator shown in FIG. 1.

With reference to FIG. 1, and in a particular embodiment of the disclosure, an actuator 1 comprises a body 2 that is generally tubular and extends along a central axis X.

The body 2 comprises in succession a first end segment 2a, an intermediate segment 2b, and a second end segment 2c, each of which has an outside surface of cylindrical shape extending along the axis X.

The first end segment 2a and the second end segment 2c are connected to the intermediate segment 2b via connection portions 2d having outside surfaces of frustoconical shape with their small bases being connected to the outside surface of the intermediate segment 2b and with their large bases connected to the outside surfaces respectively of the first end segment 2a and of the second end segment 2c.

The body 2 forms the main body of a double-acting hydraulic actuator and in conventional manner it defines an inside volume within which a rod T is mounted to slide along the axis X and projects from the first end segment 2a of the body 2. The rod is secured to a piston that subdivides the inside volume of the body 2 into two chambers that are isolated from each other.

Figure 5:
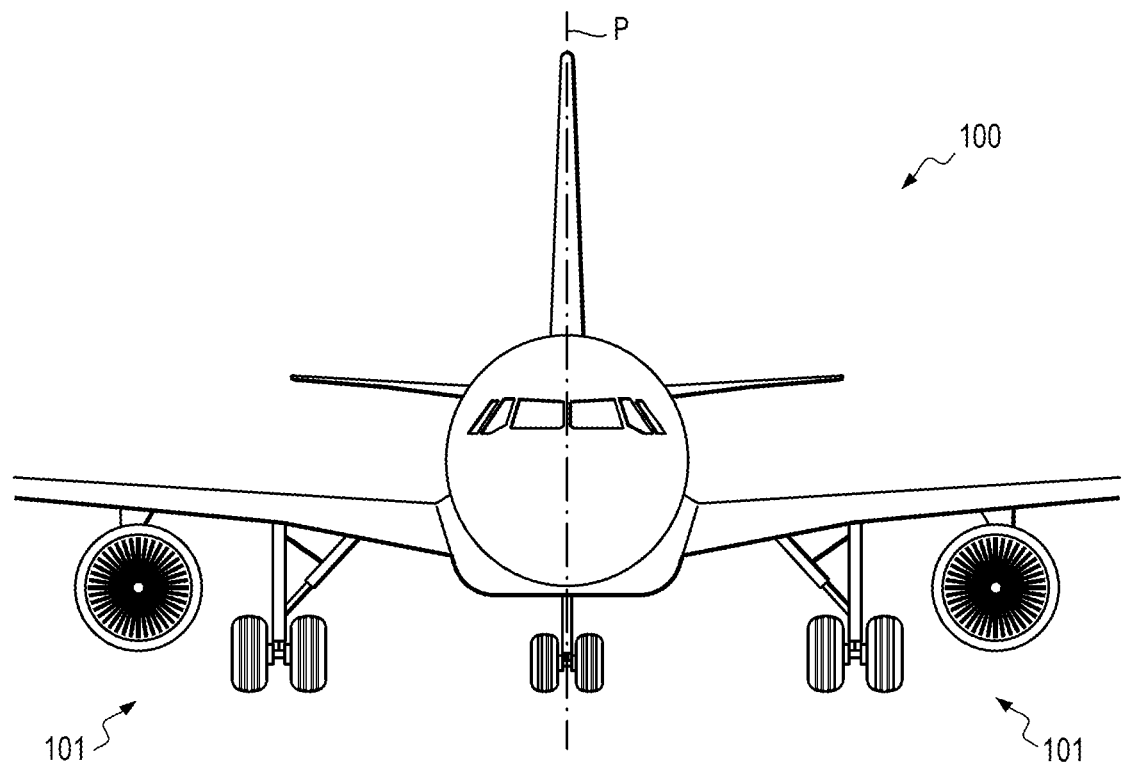
FIG. 5 is a front view of an aircraft having a landing gear mounted to be movable between a deployed position and a retracted position.

The second end segment 2c is connected to a bearing 3 for hinging the actuator 1 to the structure of an aircraft 100 shown in FIG. 5. The body 2 thus forms a connection interface with the rod of the actuator 1 and the bearing 3 forms a connection interface with the structure of the aircraft 100.

The actuator 1 has a first connection port 4.1 and a second connection port 4.2 serving to enable a fluid to be inserted into or removed from respective ones of the two chambers, thereby moving the rod. The first connection port 4.1 and the second connection port 4.2 are substantially identical, each of them having a tubular portion defining a channel arranged to receive an end portion of a connection duct.

The first connection port 4.1 and the second connection port 4.2 extend substantially parallel to the central axis X of the body 2, and their free ends extend substantially in a common plane that is orthogonal to the axis X, such that the two connection ports are in alignment with each other. The distance between the first connection port 4.1 and the body 2 is shorter than the distance between the second connection port 4.2 and the body 2, such that the first connection port 4.1 lies between the second connection port 4.2 and the body 2 in 20 all of the figures.

A first duct 5.1 connects the first connection port 4.1 to the first end segment 2a of the body 2 from which the rod of the actuator projects. The neutral axis of the first duct 5.1 extends over substantially its entire length in a plane A that contains the central axis X of the body 2 (the plane A thus constitutes a longitudinal mid-plane of the body 2). In succession, the first duct 5.1 comprises a quarter-circle portion having one end opening out into one of the chambers of the body 2, a first rectilinear portion substantially parallel to the axis X, a semicircular portion, and a second rectilinear portion extending parallel to the central axis X and facing the first rectilinear portion, with one end opening out into the first connection port 4.1.

A second duct 5.2 connects the second connection port 4.2 to the second end segment 2c of the body 2 that carries the bearing 3. The second duct 5.2 comprises a first rectilinear portion that is substantially perpendicular to the central axis X of the body 2 with one end opening out into the other one of the chambers of the body 2, and a quarter-circle portion with one end opening out into the second connection port 4.2. The rectilinear portion of the second duct 5.2 has a central axis extending in the plane A in which the central axis of the first duct 5.1 also extends, while the quarter-circle portion of the second feed duct 5.2 has a central axis extending generally in a plane B that is slightly inclined relative to the plane A and that is substantially parallel to the axis X.

The first connection port 4.1 is mechanically connected to the body 2 by two substantially rectilinear struts 6 and 7 that are substantially identical in length. Both of the struts 6 and 7 extend from the outside surface of the intermediate segment 2b of the body 2, and they converge towards each other so as to meet at a lower surface of the first connection port 4.1. Each of the struts 6 and 7 presents a cross-section that is V-shaped with its tip lying in the plane A, such that the plane A constitutes substantially a plane of symmetry for the struts 6 and 7. The free edges of the struts 6 and 7 are substantially tangential to the outside surface of the intermediate segment 2b of the body 2.

The second connection port 4.2 is mechanically connected to the body 2 by a member 8 comprising two substantially rectilinear portions 8.1 and 8.2 extending in line with each other from the outside surface of the second end segment 2c of the body 2 to a lower surface of the second connection port 4.2. In identical manner to the struts 6 7, the first portion 8.1 of the strut 8 connects the body 2 to the semicircular portion of the first duct 5.1 and presents a V-shaped cross-section with its tip lying in the plane A, such that the plane A forms substantially a plane of symmetry for the first portion 8.1 of the strut 8. The second portion 8.2 of the strut 8 connects the second connection port 4.2 to the semicircular portion of the first duct 5.1, and presents a V-shaped cross-section with its tip lying in the plane B, such that the plane B forms substantially a plane of symmetry for the second portion 8.2 of the strut 8. The free edges of the first portion 8.1 of the strut 8 are substantially tangential to the second end segment 2c of the end of the body 2, and the free edges of the second portion 8.2 strut 8 are substantially tangential to the outside surface of the semicircular portion of the first duct 5.1.

The second connection port 4.2 is also mechanically connected to the body 2 and to the first connection port 4.1 by a substantially rectilinear strut 9 extending from an upper surface of the first connection port 4.1 to a lower surface of the second connection port 4.2. The strut 9 substantially extends the strut 7, which forms a segment that is common both to the strut 7 and to the strut 9, and it presents a V-shaped cross-section with its tip lying in the plane B, such that the plane B forms substantially a plane of symmetry for the strut 9.

It should be observed that all of the struts 6, 7, 8, and 9 extend only outside the feed ducts 5.1 and 5.2 so as to avoid impeding the flow of fluid in the feed ducts 5.1 and 5.2.

In this example, the actuator 1 includes a web 10 extending in part in the plane A and in part in the plane B, providing a connection between the feed ducts 5.1 and 5.2, the struts 6, 7, 8, and 9, and also the body 2.

Advantageously, the web 10 is pierced by drain holes 11 serving to avoid liquid from stagnating on the web 10 when the actuator is positioned in such a manner that the web 10 is substantially horizontal.

The actuator 1 also has a substantially rectilinear rib 12 extending on either side of the web 10 from the quarter-circle portion of the first duct 5.1 to the junction between the semicircular portion of the second duct 5.2 and the second portion 8.2 of the strut 8. The rib 12 thus provides a direct connection between the first duct 5.1, the second duct 5.2, and the strut 8.

It can be understood that using the struts 6, 7, 8, and 9 to connect the body 2 both to the first connection port 4.1 and to the second connection port 4.2 serves to limit the weight of the actuator 1 since the struts leave empty spaces between one another. It can also be understood that the struts are not designed to transmit forces produced by the actuator, but rather to take up vibratory forces, and forces generated on the connection ports and the ducts by fluid pressure, and also forces generated on the connection ports by pipework.

Preferably, the actuator is made by additive manufacturing, in particular out of an alloy of nickel and chromium (such as the alloy produced under the trademark Inconel® by the supplier Special Metals Corporation), or out of steel or titanium. The web 10 can then act as a support for depositing material along the axis X so as to obtain a single piece. The V-shape of the struts serves to limit the number of supports needed for such deposition of material.

The person skilled in the art knows how to design the actuator 1 in order to ensure that the connection ports and the ducts 4.1, 4.2, 5.1 and 5.2 can withstand vibration and pressure. Thus, the spacing between the struts 6, 7, 8, 9, and their thicknesses need to be defined as a function of the desired second moment of area.

Naturally, the disclosure is not limited to the embodiment described, but covers any variant coming within the ambit of the disclosure as defined by the claims.

Although above, the actuator 1 is hydraulic and has connection ports 4.1 and 4.2, and hydraulic ducts 5.1 and 5.2, the actuator could equally well be electrical or indeed pneumatic, and have corresponding connection ports and ducts.

The number of ports and feed ducts could be equal to one (e.g. for a single-acting actuator), or it could be greater than two.

Although above, the struts present a cross-section that is V-shaped, their section could be of some other shape (solid, hollow, I-shaped, . . . ).

The actuator need not include a web 10.

The web 10 need not have any drain holes 11.

Although above, the body 2 is generally tubular in shape comprising a succession of segments 2a, 2b, 2c, and 2d of outside surfaces that are cylindrical or frustoconical in shape, the body 2 could be of some other shape, and for example it could comprise a single segment having an outside surface that is cylindrical in shape or of some other shape.

The first connection port 4.1 and/or the second connection port 4.2 need not extend parallel to the central axis X of the body 2.

Although above, the actuator 1 is used for unlocking the landing gear 101 mounted to be movable between a deployed position and a retracted position, the disclosure applies to any type of actuator that requires at least one offset connection port 4.1, 4.2, e.g. for opening and/or closing the doors closing the space in which the landing gear is housed, or indeed for deploying thrust reversers. The actuator 1 may equally well be used in any field other than that of aviation.

The invention claimed is:

1. An actuator comprising a body and at least a first offset connection port that is connected to the body by a first duct comprising at least one non-straight-part and projecting from said body, wherein the first connection port is mechanically connected to the body at least by a first strut and a second strut, the first strut and the second strut being different from the first duct and extending from one same lateral side of the first connection port respectively to a first segment of the body and to a second segment of the body that is axially spaced apart from the first segment.

2. The actuator according to claim 1, further comprising a second offset connection port connected to the body by a second duct comprising at least one non-straight-part and wherein the second connection port is mechanically connected to the body at least by a third strut and a fourth strut, the third strut and the fourth strut extending from the second connection port respectively to one portion and another portion of the body that are axially spaced apart from each other.

3. The actuator according to claim 2, wherein the first connection port and the connection second port extend respectively along a first axis and a second axis parallel to the first axis and have respectively a first free end and a second free end extending in a same plane, and wherein the fourth strut and the second strut have a segment in common.

4. The actuator according to claim 2, wherein at least one of the third strut and the fourth strut is arranged to connect a portion of the first duct mechanically to the body.

5. The actuator according to claim 1, wherein the first strut and second strut include respective portions lying in a longitudinal mid-plane of the body.

6. The actuator according to claim 5, wherein the first duct lies in the longitudinal mid-plane of the body.

7. The actuator according to claim 1, wherein the first strut and the second strut have an identical length between the first connection port and the body.

8. The actuator according to claim 1, wherein the first strut and the second strut has a cross-section that is V-shaped with its tip lying in a longitudinal mid-plane of the body.

9. The actuator according to claim 1, including a web providing a mechanical connection between the body, the first duct, and the first strut and the second strut.

10. The actuator according to claim 9, wherein the web includes drain holes.

11. The actuator according to claim 9, further comprising at least one rib extending on one side of the web from the first duct to one of the first strut and the second strut.

12. The actuator according to claim 1, wherein the body, the first duct, and the first connection port together form a single piece that is obtained by additive manufacturing.

13. A landing gear having at least an extended position and a retracted position, and including an actuator for locking or unlocking the landing gear in at least one of the extended and retracted positions, the landing gear wherein the actuator is the actuator according to claim 1.

* * * * *